United States Patent
Meyer-Gräfe et al.

(10) Patent No.: US 7,430,690 B2
(45) Date of Patent: Sep. 30, 2008

(54) CIRCUIT ARRANGEMENT FOR PROTECTED DATA TRANSMISSION, PARTICULARLY IN RING-SHAPED BUS SYSTEMS

(75) Inventors: Karsten Meyer-Gräfe, Hövelhof (DE); Thorsten Behr, Horn-Bad Meinberg (DE); Wolfram Kress, Siegburg (DE); Peter Wratil, Rosengarten (DE)

(73) Assignee: Phoenix Contact GmbH & C. KG, Blomberg (DE)

( * ) Notice: Subject to any disclaimer, the term of this patent is extended or adjusted under 35 U.S.C. 154(b) by 0 days.

(21) Appl. No.: 11/593,308

(22) Filed: Nov. 6, 2006

(65) Prior Publication Data

US 2007/0055912 A1   Mar. 8, 2007

Related U.S. Application Data

(62) Division of application No. 10/009,444, filed as application No. PCT/DE00/01796 on Jun. 5, 2000, now Pat. No. 7,152,188.

(30) Foreign Application Priority Data

Jun. 4, 1999   (DE) ................. 199 25 693

(51) Int. Cl.
*G06F 11/00* (2006.01)

(52) U.S. Cl. ......................................... 714/43; 714/47
(58) Field of Classification Search .................. 714/47, 714/43, 717, 746; 710/15, 59; 700/26, 108
See application file for complete search history.

(56) References Cited

U.S. PATENT DOCUMENTS

| | | | | |
|---|---|---|---|---|
| 4,486,826 A | * | 12/1984 | Wolff et al. | 714/9 |
| 5,361,334 A | * | 11/1994 | Cawley | 709/243 |
| 5,390,188 A | * | 2/1995 | Dawson | 714/717 |
| 5,425,017 A | * | 6/1995 | Copley et al. | 370/245 |
| 5,602,827 A | * | 2/1997 | Lindeborg et al. | 370/223 |
| 5,745,268 A | * | 4/1998 | Eastvold et al. | 398/25 |
| 6,385,562 B1 | * | 5/2002 | Roth et al. | 702/188 |

\* cited by examiner

*Primary Examiner*—Scott T. Baderman
*Assistant Examiner*—Paul F Contino

(57) ABSTRACT

A circuit arrangement allows data, which are necessary for building up fault-tolerant structures, to be transmitted on standard ring-shaped bus systems. Its implementation requires a monitoring unit and input and output units which transmit or receive data for control. The circuit arrangement handles the task of detecting any faults which can become a danger for the process within a machine or plant. Due to its internal configuration, the circuit arrangement identifies any fault even before the detection of the fault and initiates a protected switch-off. In this arrangement, it is of no importance whether it is the external control unit or the bus system used which is responsible for the fault.

6 Claims, 2 Drawing Sheets

CIRCUIT ARRANGEMENT FOR PROTECTED DATA TRANSMISSION, PARTICULARLY IN RING-SHAPED BUS SYSTEMS

CROSS-REFERENCE TO RELATED APPLICATIONS

The present application is a Divisional Application of U.S. patent application Ser. No. 10/009,444, filed May 9, 2002 now U.S. Pat. No. 7,152,188 of the same inventors. This Divisional application claims all priority of its parent application, U.S. patent application Ser. No. 10/009,444, which is the entry into national stage for International Application PCT/DE00/01796, filed on Jun. 5, 2000, and claimed priority of DE 199 25 693.4, which was filed on Jun. 4, 1999.

STATEMENT REGARDING FEDERALLY SPONSORED RESEARCH & DEVELOPMENT

Not Applicable.

BACKGROUND OF THE INVENTION

1. Field of the Invention

The invention relates to a circuit arrangement for protected data transmission, particularly in ring-shaped bus systems.

2. Description of Relevant Art

In machine and plant construction today, movements and processes are not infrequently controlled which represent a danger to the life and health of persons, particularly the operating personnel, in the case of a fault or if they fail. Apart from these dangers, however, valuable machine parts must also be protected which can suffer great financial damage in the case of possible malfunctions.

Any faults which may occur must, therefore, be recognized by the process or the existing control facilities and the machine should always be driven in a state which can be considered safe. As a rule, redundant structures are necessary for this which monitor the safety functions independently of the actual control. In machine or plant construction, detection of a single error is frequently sufficient for fault detection. After this fault has been detected, the control process can then be interrupted and stay in a safe state. This prevents any damage by faulty continuation of the process.

The methods for fault detection and the measures necessary for these are stated in international standards DIN V VDE 0801 and DIN ISO 61508. By means of the principles given in these standards, the manufacturers of automation equipment have developed in recent years different strategies which allow safe transmissions on bus systems, see, for example, the "profibus with F-Profil, PNO and safety-bus P by Pilz and Sick.

In addition, control systems will reach the market which already have internally redundant structures and thus, in interplay with said safe bus systems, allow fault detection; see, for example, the bus systems from Siemens, particularly the equipment series S 7 400 F, or the PSS 3000 series by Pilz.

However, the methods implemented there can only be used with completely new installation of the necessary components and protect only inadequately against systematic faults.

BRIEF SUMMARY OF THE INVENTION

Instead, the invention has the object of detecting faults in a process which is only built up with standard units.

In addition, it should preferably be not only any faults occurring in the transport of data via a bus system used, but also disturbances or programming errors in the control device which are detected and eliminated.

The circuit arrangement thus represents an implementation of a method which has already been filed under the post-published German patent application no. 198 57 683.8, the full extent of the content of which is also made the subject matter of the present patent application by reference.

The method is particularly suitable for all ring-shaped bus systems, the technology described being optimally adapted for the interbus standard. In this case, a requirement profile was already worked out at the beginning of 1999 and then published, IEE journal, April 1999, Karsten Meyer-Gräfe: "Interbus goes Safety".

BRIEF DESCRIPTION OF THE DRAWINGS

In the text which follows, the invention is described in more detail, referring to preferred embodiments and the attached drawings, in which.

DETAILED DESCRIPTION OF THE INVENTION

Figure 1:
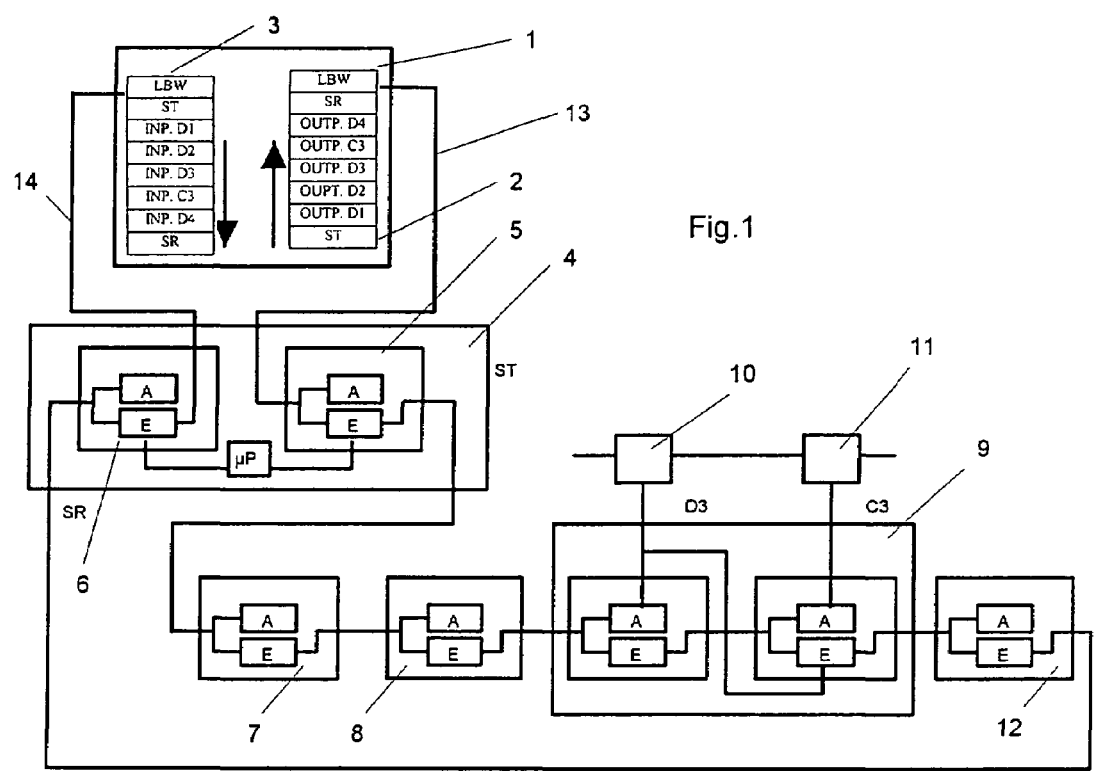
FIG. 1 shows the configuration for a first embodiment of a system for protected data transmission.

In the text which follows, the invention will be described in greater detail, initially by referring to FIG. 1. FIG. 1 shows a suitable configuration for such a system.

The control unit (1) handles all control functions in the process as is known, for example, from the conventional interbus system. The control unit (1) also detects possible faults and can interrupt processes or bring them to a safe state.

In the case of its own failure or in the case of faulty data transport, however, the control unit (1) is conventionally not able to produce the desired safe state. This failure also occurs, for example, if there is extensive separation between process control and safety control in the control system. Since there is conventionally no redundancy here, either, an undetected fault may have grave consequences.

According to the invention, other components are added which detect and eliminate a possible fault. These units are: a peripheral monitoring unit (4) and one or more peripheral safety-related units (9) in the process, which are only necessary where safety-related data are received or transmitted.

The control unit (1) contains a data map register (2) which sends all output data and other checking signals via the data line (13) to the peripheral units (7, 8, 12, peripheral safety-related unit 9 and peripheral monitoring unit 4).

Since the bus transport works in a similar way to a shift register, all peripheral units send their input data to the control unit in the same bus cycle via the return line (14) and these data are available in the data map register (3). In a subsequent SPC (stored-program control) cycle, the SPC then processes the data from its two map registers (2, 3) and thus generates the necessary state for the process.

Without the peripheral monitoring unit (4) and the peripheral safety-related unit (9), however, the SPC is not capable of controlling a programming error, a state due to disturbance or failure or a data error due to the wrong bus transport. The peripheral monitoring unit (4), therefore, contains its own microprocessor which monitors the transmitted data of the SPC and only examines the safety-related quantities for appropriateness, particularly their correctness.

Thus, the peripheral monitoring unit (4) with the transfer unit (5) is capable of monitoring the SPC. However, the peripheral monitoring unit (4) can also additionally read the data of the inputs of the peripheral units via the transfer unit (6) installed in the return path. Since the peripheral safety-related unit (9) also forwards its output information (D3) directly to the input section of the bus unit (23), it is possible to check directly whether the bus transfer has worked correctly.

Furthermore, the peripheral monitoring unit (4) with its transfer unit (5) is also capable of manipulating the data for the peripheral safety-related unit (9). In particular, the peripheral monitoring unit (4) can overwrite data of the SPC and thus prevent agreement with the data output from the peripheral safety-related unit (9). The peripheral safety-related unit (9) becomes active only if it has received an agreement for the data of the output unit (10) via the checking unit (11).

The timing with the data transport is shown in the following table:

|    |     | ST  |     | 1   |     | 2   |     | D3  |     | C3  |     | 4   |     | SR  |     |
|----|-----|-----|-----|-----|-----|-----|-----|-----|-----|-----|-----|-----|-----|-----|-----|
| SH | MT  | A   | E   | A   | E   | A   | E   | A   | E   | A   | E   | A   | E   | A   | E   | MR |
| 0  | LBW |     | ST  |     | E1  |     | E2  |     | E3  |     | EC3 |     | E4  |     | ESR |    |
| 1  | ASR | LBW | LBW | ST  | ST  | E1  | E1  | E2  | E2  | E3  | E3  | EC3 | EC3 | E4  | E4  | ESR |
| 2  | A4  | ASR | ASR | LBW | LBW | ST  | ST  | E1  | E1  | E2  | E2  | E3  | E3  | EC3 | EC3 | E4 |
| 3  | 1   | A4  | A4  | ASR | ASR | LBW | LBW | ST  | ST  | E1  | E1  | E2  | E2  | E3  | E3  | EC3 |
| 4  | A3  | 1   | AC3 | A4  | A4  | ASR | ASR | LBW | LBW | ST  | ST  | E1  | E1  | E2  | E2  | E3 |
| 5  | A2  | A3  | A3  | AC3 | AC3 | A4  | A4  | ASR | ASR | LBW | LBW | ST  | ST  | E1  | E1  | E2 |
| 6  | A1  | A2  | A2  | A3  | A3  | AC3 | AC3 | A4  | A4  | ASR | ASR | LBW | LBW | ST  | ST  | E1 |
| 7  | ST  | A1  | A1  | A2  | A2  | A3  | A3  | AC3 | AC3 | A4  | A4  | ASR | ASR | LBW | LBW | ST |
| 8  |     | ST  | ST  | A1  | A1  | A2  | A2  | A3  | A3  | AC3 | AC3 | A4  | A4  | ASR | ASR | LBW |

The timing diagram shows the state after each shift information in the ring by means of a preferred example, the Interbus system by Phoenix Contact GmbH and Co. KG.

The information AC3 can be manipulated by the peripheral monitoring unit (4) with the transfer unit (5) and can be overwritten. The peripheral safety-related unit (9) thus receives in its checking logic (11) an additional information item which prevents a faulty output.

As can also be seen from the timing diagram, the peripheral monitoring unit (4) can also read the data of the output from the peripheral safety-related unit (9) (EC3). These data represent the direct output information of the peripheral safety-related unit (9) so that a bus error is reliably detected.

Figure 2:
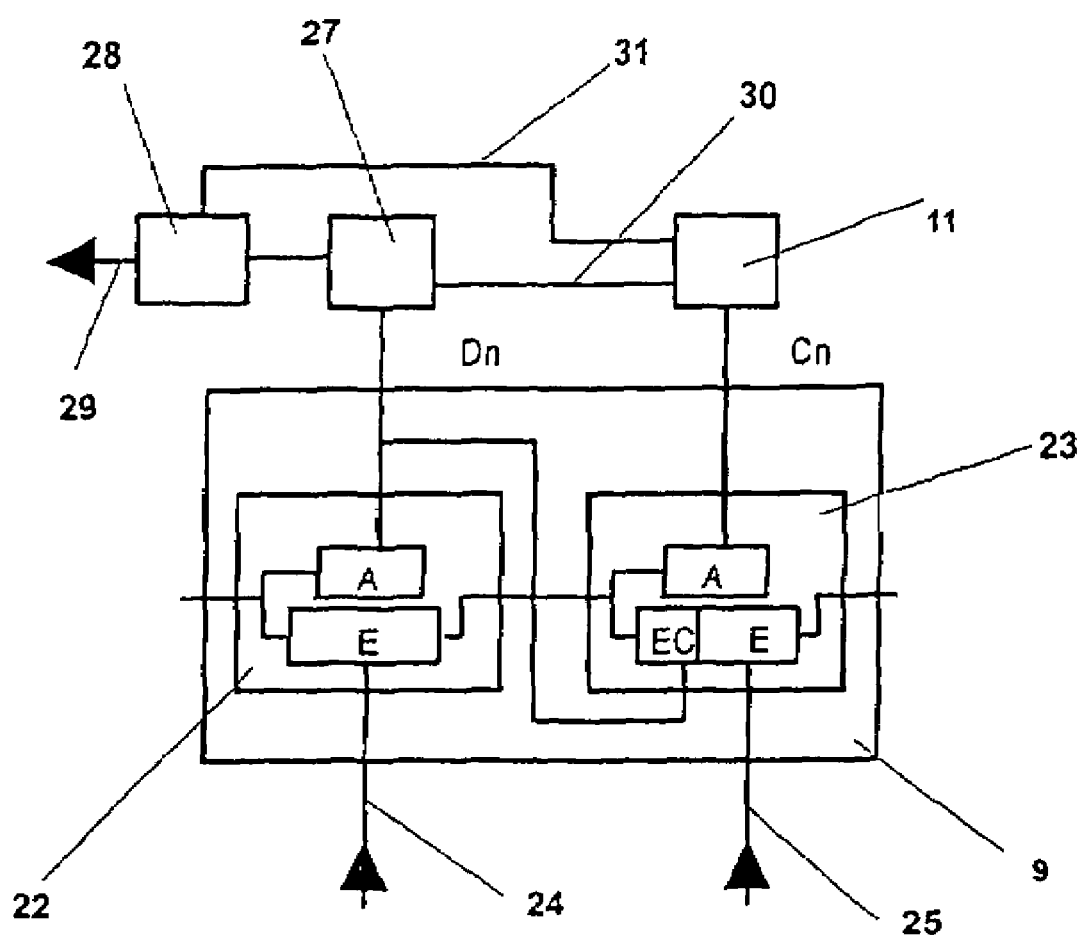
FIG. 2 shows the internal configuration of the peripheral safety-related unit of the system for protected data transmission.

The internal configuration of the peripheral safety-related unit (9) is shown in FIG. 2.

The peripheral safety-related unit (9) consists of two bus units (22, 23) so that input information can be fetched redundantly (24, 25). In addition, the output information Dn from a bus unit (22) is mapped via the input section of the other bus unit (23). A possible error in the internal storage or during the bus transport is thus detected in the subsequent cycle of the bus transport. The output information Dn is written into the buffer (27) by the control unit (SPC).

However, the checking logic (11) additionally decides whether the information of the buffer (27) appears at the peripheral unit via the output logic (28). This checking logic (11) can either release the stored information via the line (30) or delete the state via the line (31) so that the output (29) brings the control process into a safe state.

In principle, however, the circuit arrangement operates in many areas just like a normal decentralized SPC system. The components merely additionally allow inputs to be redundantly monitored and stored output information to be examined for appropriateness, particularly freedom from faults before it is output. Furthermore, the monitoring unit can also detect faults which have not only been produced by failure or disturbance but were caused by an error in programming or parameterizing.

The present circuit arrangement thus allows data which are necessary for configuring fault-tolerant structures to be transmitted on standard ring-shaped bus systems.

To implement the invention, a monitoring unit and peripheral input and output units transmitting or receiving data for control purposes are used.

The circuit arrangement handles the task of detecting any faults which can become a danger for the control process, particularly for the transmission of control, sensor or actuator data, within a machine or plant. Due to its internal configuration, the circuit arrangement identifies a possible error even before the error is transmitted to the control process and initiates a protected switch-off. In this arrangement, it is of no importance whether it is the external control unit or the bus system used which is responsible for the error.

We claim:

1. A peripheral safety-related unit in a system for protected data transmission with a ring-shaped bus, comprising:
    two bus units (22, 23), to forward the output data of the bus unit (22) also to the input section of the other bus unit (23) in order to be able to fetch information from a control process via redundant input channels (24, 25) and in order to provide the output data of a peripheral monitoring unit (4) for read-back, said two bus units being connected in series to said ring-shaped bus, wherein the output information from a first bus unit of said two bus units is mapped via an input section of the other bus unit of said two bus units in addition to said fetching of information from the control process via said redundant input channels,
    a buffer (27) in which the output data are temporarily stored before their release,
    an output logic (28) via which the temporarily stored data are output, and
    a checking logic (11) which decides whether the data stored in the buffer (27) are output via the output logic (28).

2. The system for protected data transmission, comprising a peripheral safety-related unit as claimed in claim 1, particularly in ring-shaped bus systems, in which a peripheral monitoring unit (4) checks data sent out by a control unit (1) and examines them for faults and in the case of a fault suppresses or deletes release data for said peripheral safety-related unit (9) so that a fault cannot reach a control process, particularly not data transmission sequences.

3. The peripheral safety-related unit as claimed in claim 1, characterized in that the checking logic (11) receives information from the peripheral monitoring unit (4) in order to be able to prevent a faulty output by this means.

4. The system as claimed in claim 2, in which temporarily stored data of the peripheral safety-related unit (9) are read via a bus unit (23) and are monitored and detected by a checking logic (11).

5. The system as claimed in claim 2, in which a safe state of data transmission, particularly of an output unit (10), is initiated by the checking logic (11).

6. The system as claimed in claim 4, characterized in that the checking logic (11) releases or deletes the temporarily stored data.

* * * * *